US012597715B2

(12) United States Patent
Kay et al.

(10) Patent No.: US 12,597,715 B2
(45) Date of Patent: Apr. 7, 2026

(54) DIRECT RADIATING PHASED ARRAY ANTENNA SYSTEMS

(71) Applicant: Hughes Network Systems, LLC, Germantown, MD (US)

(72) Inventors: Stanley Kay, Gaithersburg, MD (US); Graham Taylor, Gaithersburg, MD (US); Thomas Alan Walter, Ellicott City, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 64 days.

(21) Appl. No.: 18/621,935

(22) Filed: Mar. 29, 2024

(65) Prior Publication Data

US 2025/0079721 A1 Mar. 6, 2025

Related U.S. Application Data

(60) Provisional application No. 63/535,432, filed on Aug. 30, 2023.

(51) Int. Cl.

*H01Q 21/06* (2006.01)
*H01Q 1/28* (2006.01)
*H01Q 9/04* (2006.01)

(52) U.S. Cl.

CPC ........... *H01Q 21/065* (2013.01); *H01Q 1/288* (2013.01); *H01Q 9/0407* (2013.01)

(58) Field of Classification Search

CPC ...... H01Q 1/02; H01Q 1/288; H01Q 3/26-30; H01Q 9/0407; H01Q 21/0025; H01Q 21/065

See application file for complete search history.

(56) References Cited

U.S. PATENT DOCUMENTS

| | | | | | |
|---|---|---|---|---|---|
| 5,303,286 | A * | 4/1994 | Wiedeman | H04B 7/18556 370/335 |
| 10,670,711 | B2 * | 6/2020 | Devaraj | G01S 13/10 |
| 11,462,837 | B2 * | 10/2022 | Kuwabara | H01Q 21/065 |
| 2024/0405444 | A1 * | 12/2024 | Varonen | H01Q 3/36 |

FOREIGN PATENT DOCUMENTS

| | | | |
|---|---|---|---|
| WO | 2022120461 A1 | 6/2022 |
| WO | 2023155018 A1 | 8/2023 |

* cited by examiner

*Primary Examiner* — Hasan Islam

(74) *Attorney, Agent, or Firm* — Kilpatrick Townsend & Stockton LLP

(57) ABSTRACT

Systems and methods are described herein for providing a direct radiating antenna (DRA) for installation on a communication satellite. The DRA is a phased array of microstrip patch antennas implemented in a very compact profile on a planar substrate. Embodiments of array are implemented as an array of radiating element configurations, each having a microstrip radiating element (e.g., a square patch) coupled to a first side of the planar substrate, amplifiers coupled to a second side of the planar substrate, and filters (e.g., diplexers) coupled between the radiating elements and amplifiers. A thermal conduction layer (e.g., a graphoil or vapor chamber layer) is thermally coupled with the second side of the planar substrate, and a thermal radiation layer (e.g., an optical solar reflector) is thermally coupled with the thermal conduction layer.

19 Claims, 5 Drawing Sheets

DIRECT RADIATING PHASED ARRAY ANTENNA SYSTEMS

CROSS-REFERENCES TO RELATED APPLICATION

This application claims priority to U.S. Provisional Patent Application No. 63/535,432, filed Aug. 30, 2023, entitled "Direct Radiating Phased Array Antenna Systems," the entire disclosure of which is hereby incorporated by reference, for all purposes, as if fully set forth herein.

BACKGROUND

High-gain, direct radiating phased array antennas (DRAs), such as for use on a communication satellite, tend to have a relatively large profile. For example, it can be difficult to satisfy mechanical and thermal design constraints as the profile of such a DRA shrinks. However, shrinking the profile can provide certain features. For example, providing such a small profile DRA can help facilitate stacking a high number of satellites in a single launch vehicle for deployment.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by letter and/or a dash and a second label that distinguishes among the similar components. If only the first reference label is used in the specification, the description is applicable to any one of the similar components having the same first reference label irrespective of the second reference label.

DETAILED DESCRIPTION

In recent years, there has been a move toward convergence of satellite and cellular networks to support and enhance global connectivity, including in remote, rural, and maritime regions where terrestrial infrastructure tends to be limited or non-existent. For example, the 3rd Generation Partnership Project (3GPP), a body responsible for development and maintenance of global cellular standards, has introduced technical standards and specifications to allow non-terrestrial networks (NTNs) to be part of fifth generation (5G) cellular network architectures. These and other technological developments seek to integrate satellite communications with 5G New Radio (NR) frameworks and/or other terrestrial cellular capabilities by specifying network functions, interfaces, and the like.

Integrating satellites with terrestrial cellular frameworks can involve overcoming several technical obstacles, such as latency of ground-to-satellite links. However, such integration can also provide several features. One feature is that use of satellites can extend cellular coverage to geographically isolated areas that otherwise do not have access to terrestrial infrastructures (e.g., cell towers). A related feature is that extending coverage can also extend support for remote emergency services, Internet of Things (IoT) and other deployments, and the like. Another feature is that satellite links can be used as redundant (e.g., backup) communication links in the event of terrestrial network failures, which can improve the reliability and resilience of the network. Another feature is that certain satellite features can be used to enhance support for secure government communications. Another feature is that satellite links can be used to help with load balancing and with offloading of traffic from congested terrestrial links (e.g., in densely populated areas, or at high-demand periods of time).

Technical standards and specifications for NTN extensions of cellular networks can identify specific frequency bands for satellite operations within the 5G spectrum to increase compatibility and decrease interference. Some current NTN approaches use S-band for communications between terrestrial 5G networks and satellites, where the satellite tends to be low earth orbit (LEO) and/or geostationary Earth orbit (GEO) satellites. S-band satellites generally operate in a frequency range of approximately 2 to 4 Gigahertz (GHz), which is part of the so-called "S-band" of the electromagnetic spectrum. The S-band tends to be well-suited for NTN uses because it manifests particularly good performance with respect to range, bandwidth, atmospheric penetration, and other factors.

Figure 1:
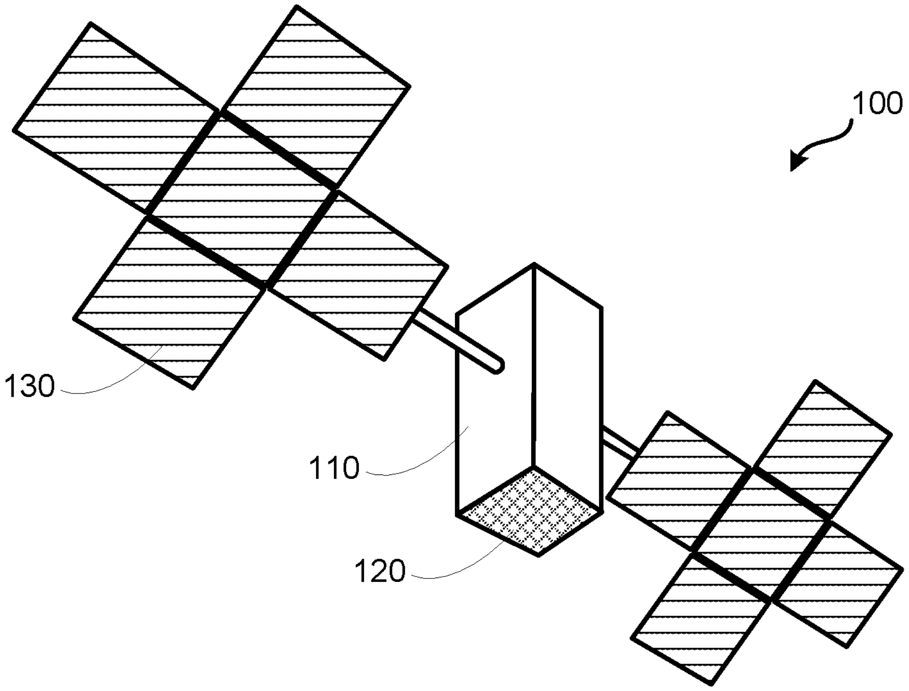
FIG. 1 shows a simplified satellite that can be deployed as part of a non-terrestrial network (NTN) expansion of a cellular network architecture.

For context, FIG. 1 shows a simplified satellite 100 that can be deployed as part of a non-terrestrial network (NTN) expansion of a cellular network architecture. As illustrated, the satellite 100 can include a satellite main body 110, an antenna system 120 (including one or more antennas), and one or more solar panels 130. Though not explicitly shown, the satellite 100 can include several subsystems and components. For example, the satellite 100 can include transponders to receive, amplify, and retransmit signals back to Earth (in the S-band frequency range). In some embodiments, the satellite 100 also includes onboard processing capabilities, such as for real-time processing of signals (e.g., demodulation, decoding, multiplexing, routing, etc.). The satellite 100 can also include one or more control systems, such as gyroscopes, star trackers, and/or other components for attitude and orbit control. The satellite 100 can also include a propulsion system for orbit insertion, station-keeping, end-of-life deorbit maneuvers, and the like. The illustrated solar panels 130 are part of a power system that harnesses solar energy and stores the energy (e.g., to ensure continuous availability of power, even during periods when the sun is not visible to the satellite 100).

Antenna systems of S-band satellites often include large deployable antennas, such as parabolic antennas, for communication with ground stations and user terminals. In the illustrated satellite 100, the antenna system 120 is shown as a direct radiating antenna (DRA) composed of an array of patch radiating elements, as described herein. The antenna system 120 is coupled with a face of the satellite main body 110. Embodiments of the DRA antenna (or antennas) are configured for dynamic beamforming. Beamforming can be used to dynamically focus beams on particular (e.g., high-demand) areas, to support beam hopping, to optimize coverage, to manage interference, and/or to provide other features. This capability supports mobile 5G users and addresses varying traffic loads. Although not explicitly shown, the antenna system 120 can also include antennas for telemetry, tracking, and command (TT&C) operations, for inter-satellite communications, and/or for other purposes.

In some embodiments, the satellite 100 is part of a constellation of such satellites. The satellite constellation can be designed to effectively expand a cellular network (e.g., a 5G network) for global (or regional) coverage. Embodiments can be designed to provide high-capacity, high-throughput communication links for direct-to-device communication services. Some implementations additionally use the satellite constellation to provide backhaul support for terrestrial portions of the infrastructure. In such a constellation, the satellites are arranged in one or more orbits (e.g., LEO and/or MEO). The satellites are in communication with a network of ground stations, such as gateway terminals. The ground terminals can provide ground-to-satellite communication links, interfaces between the satellite and terrestrial portions of the infrastructure, and certain command and control functions for the satellites. The satellites may also be in communication with each other (e.g., with adjacent satellites in the same orbit and/or with satellites in adjacent orbits) via inter-satellite links (ISLs).

Although descriptions herein refer specifically to 5G cellular networks, S-band communications, and the like, techniques described herein can be applied to any suitable high-gain, patch antenna-based satellite DRAs. For example, techniques described herein can be extended to other cellular technologies, such as sixth generation (6G) cellular technologies. Similarly, as new NTN standards and specifications are developed, techniques described herein can be extended to any suitable frequency bands, such as the L-band (1-2 GHZ), C-band (4-8 GHz), Ku-band (12-18 GHz), Ka-band (26.5-40 GHz), V-band (40-75 GHz), Q/V-band (33-75 GHZ), millimeter wave bands above 75 GHz, etc.

Figure 2:
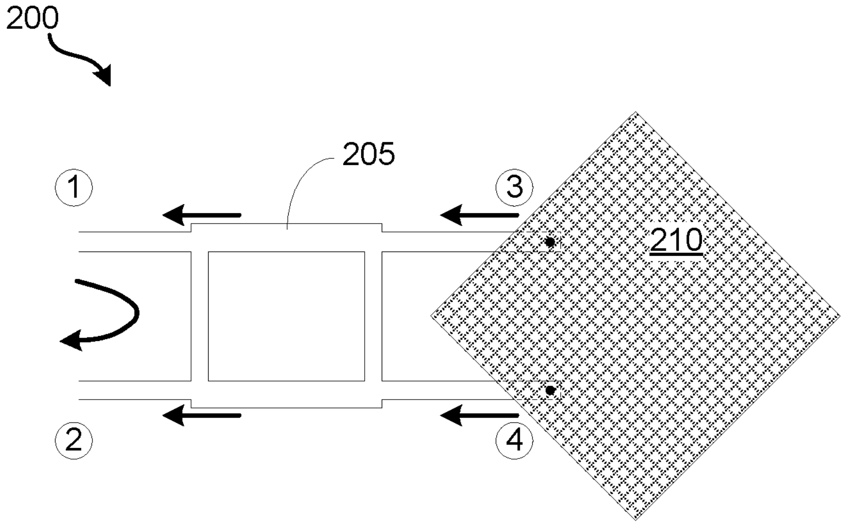
FIG. 2 shows an example of a radiating element configuration for use in a satellite direct radiating antenna (DRA), such as those described herein.

FIG. 2 shows an example of a radiating element configuration 200 for use in a satellite direct radiating antenna (DRA), such as those described herein. In some embodiments, the DRA includes several thousand instances of the radiating element configuration 200. The illustrated radiating element configuration 200 is designed to transmit on one circular polarization orientation (e.g., right-hand circular polarization, RHCP) and to receive on the orthogonal circular polarization orientation (e.g., left-hand circular polarization, LHCP). As described above, embodiments of the radiating element configuration 200 are designed to operate in the S-band (2 to 4 GHZ).

The illustrated radiating element configuration 200 includes a radiating element 210. The radiating element 210 is a microstrip antenna, or "patch" antenna. Typically, the radiating element 210 acts as a resonator at a fundamental mode, with the electric field distribution over the radiating element 210 resembling a half-wave dipole pattern along its length. As such, for a square radiating element 210, each side length is typically designed to be approximately one half of the wavelength of the fundamental frequency (e.g., the carrier) to be received. In some cases, the effective wavelength is shorter than the free space wavelength of the fundamental frequency because of a higher dielectric constant of the substrate material of the radiating element 210. Still, the S-band frequency range generally corresponds to wavelengths of between approximately 15 centimeters (cm) at 2 GHz and approximately 7.5 cm at 4 GHZ, or a square radiating element 210 side length of between approximately 3.75 cm to 7.5 cm. Circular radiating elements 210 (i.e., circular patches) tend to be designed with a diameter that is approximately ⅓ the wavelength of the fundamental frequency to be received. Often, numerical methods, computer simulations, empirical formulas, and/or other techniques are used to accurately predict the resonant frequency of a radiating element 210 design and thereby to optimize radiating element 210 dimensions for particular reception characteristics.

As illustrated, the radiating element 210 (a "patch") can be coupled with a coupler 205. Ports of the coupler 205 are labeled with numbers 1-4 in circles (representing "port 1" through "port 4"). In an illustrative operational case, port 1 is fed with a transmit chain to produce RCHP at port 3, and port 2 is fed with a receive chain to produce LHCP at port 4. Although RCHP and LHCP are orthogonal, there can still be some self-interference when signals with those polarization orientations are concurrently produced by a same radiating element 210. Techniques are used to mitigate such self-interference.

The coupler 205 is illustrated as a "single-box branch-line" coupler. Such a single-box coupler 205 can provide a single null for matching and is thus narrow-band. In an alternative embodiment, the coupler 205 is implemented as a "2-box branch-line" coupler. Such a 2-box coupler 205 can provide good coverage to two bands. Embodiments of the coupler 205 are implemented as "strip-line" or "micro-strip" couplers, which can be reduced in size by using an appropriate dielectric value and/or by "stubbing up" (i.e., adding one or more extensions or protrusions (stubs) to the radiating patch or to the feed line for impedance matching, bandwidth enhancement, resonance fine-tuning, and/or the like).

Figure 3:
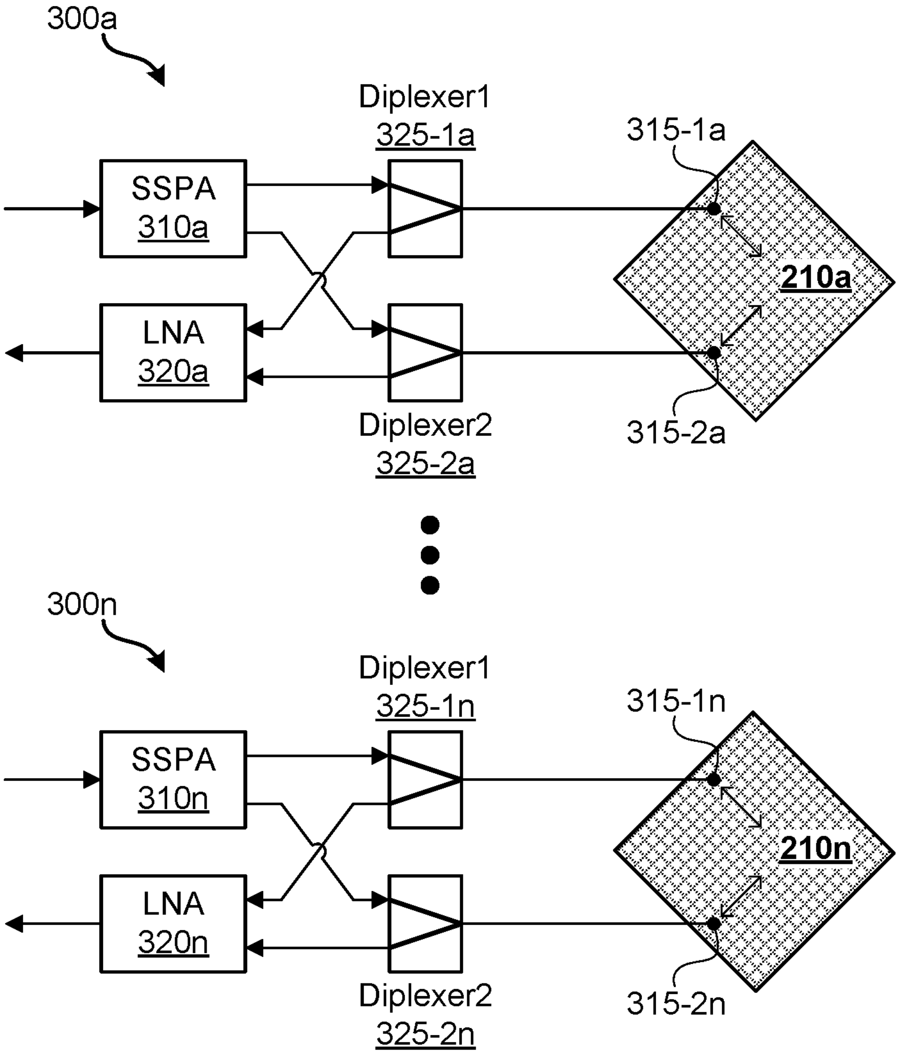
FIG. 3 shows another example of radiating element configurations for use in a satellite DRA, such as those described herein.

FIG. 3 shows another example of radiating element configurations 300 for use in a satellite direct radiating antenna (DRA), such as those described herein. As shown, there may be N instances of the radiating element configuration 300 included in a single DRA (N is an integer greater than one). In some implementations, N is several thousand. As in FIG. 2, each instance of the radiating element configuration 300 includes a radiating element 210 (i.e., radiating element configuration 300*a*-300*n* are illustrated as including radiating elements 210*a*-210*n*, respectively). Each radiating element 210 is designed to transmit in both RHCP and LHCP in the S-band. As noted above, the radiating element 210 is a microstrip antenna, or "patch" antenna.

The transmit path of each radiating element configuration 300 includes a power amplifier (e.g., illustrated as a solid-state power amplifier, SSPA) 310, and the receive path of each radiating element configuration 300 includes a low-noise amplifier (LNA) 320. The SSPA 310 includes semiconductor devices (e.g., field-effect transistors (FETs), bipolar junction transistors (BJTs), etc.) that amplify radio frequency (RF) signals to power levels desired for transmission by its respective radiating element 210. Each SSPA 310 can include components for input signal conditioning (e.g., filters), amplification (e.g., one or more stages of semiconductor amplification), output matching and filtering (e.g., matching circuits and filters), and control and protection (e.g., gain adjustment, overdrive protection, load mismatch protection, temperature compensation, etc.). Each SSPA 310 can be implemented as one or more SSPAs. Each LNA 320 is configured to amplify weak signals received by its respective radiating element 210 with minimal addition of noise. The LNA 320 effectively increases the sensitivity and selectivity of the receive path, such as by improving signal-to-noise ratio (SNR) and other receive characteristics. Each LNA 320 can include an amplification stage, input and output matching networks, biasing circuitry, stability enhancements, and/or other components.

In effect, each radiating element configuration 300 includes a transmit path through its respective SSPA 310 and a receive path through its respective LNA 320. The transmit path and the receive path can be designed to operate in different respective sub-bands of the S-band. For example, embodiments can be designed so that each radiating element 210 transmits and receives simultaneously on both RHCP and LHCP. To support the radiating element 210 transmitting and receiving simultaneously on both LCHP and RHCP, embodiments include diplexers 325. As illustrated, each radiating element configuration 300 can include two diplexers 325 (e.g., radiating element configuration 300*a* is illustrated as including diplexer 325-1*a* and diplexer 325-2*a*, and radiating element configuration 300*n* is illustrated as including diplexer 325-1*n* and diplexer 325-2*n*).

Each diplexer 325 is a passive radio-frequency device that combines or splits two different frequency bands. The diplexer 325 permits two different signals (i.e., the receive and transmit signals) at distinct frequencies (i.e., the high sub-band and low sub-band) to share a common path (i.e., the radiating element 210 path), while maintaining isolation between the signals. Each diplexer 325 has three ports: a high-sub-band port, a low-sub-band port, and a common port. A high-pass filter (or filter network) is coupled between the high-sub-band port and the common port, and a low-pass filter (or filter network) is coupled between the low-sub-band port and the common port. The low-pass and high-pass filters are designed to have minimal insertion loss in their respective passbands and high isolation in their respective stopbands, such that the receive and transmit frequency bands can be used simultaneously without interference.

In each radiating element configuration 300, the respective high-sub-band ports of the two diplexers 325-1 and 325-2 can be coupled with outputs from the SSPA 310, the respective low-sub-band ports of the two diplexers 325-1 and 325-2 can be coupled with inputs to the LNA 320, and the respective common ports of the two diplexers 325-1 and 325-2 can be coupled with feed ports 315-1 and 315-2 of the radiating element 210. As illustrated by arrows next to each feed port 315, one feed port 315-1 of each radiating element 210 is configured for resonance parallel to a first pair of edges of the radiating element 210, and the other feed port 315-2 of each radiating element 210 is configured for resonance parallel to the other pair of edges of the radiating element 210 (i.e., in orthogonal directions).

Figure 4:
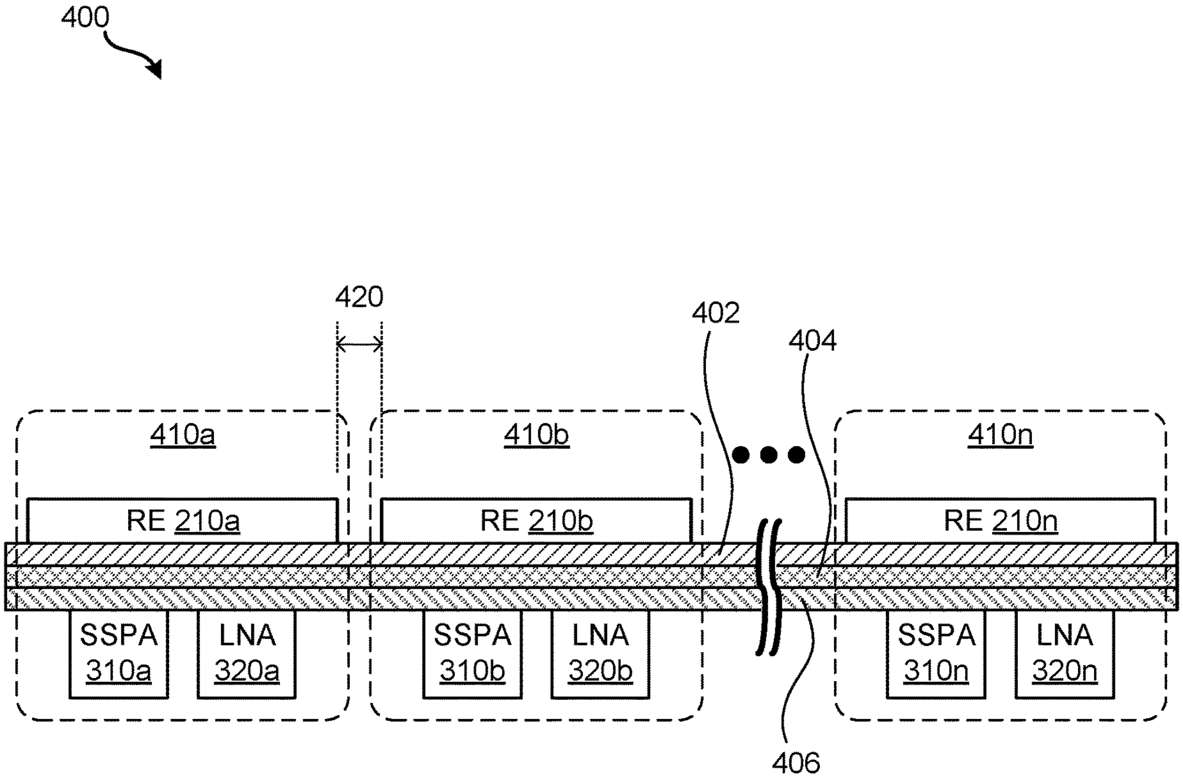
FIG. 4 shows an example patch antenna array of radiating element configurations.

FIG. 4 shows an example patch antenna array 400 of radiating element configurations 410. Each radiating element configuration 410 can be an implementation of radiating element configuration 300 of FIG. 3. As illustrated, each radiating element configuration 410 includes a respective radiating element 210, SSPA 310, and LNA 320. As noted above, each radiating element 210 is a microstrip antenna, or "patch" antenna.

In the patch antenna array 400, the spacing between radiating elements 210 (the "patch spacing" 420) can be approximately one-half of the free-space wavelength for full horizon-to-horizon scan without grating lobes. Since this scan volume may not be practical based on certain design constraints, the patch spacing 420 can be relaxed to slightly larger values. As noted above, in embodiments having square radiating elements 210, the side length of each radiating element (the "patch size") can also be approximately one-half of the wavelength. However, the wavelength used for the patch size may be the wavelength in the dielectric board material of the substrate on which the radiating elements are mounted, not the free space wavelength. Using such values, overlaps of radiators are avoided, and spacing may be adjusted to provide better isolation between radiators.

As illustrated, the patch antenna array can include a stack-up of planar layers, including at least a first side of the planar stack-up and a second side of the planar stack-up. For example, from one perspective, the first side is the top side of the planar stack-up and the second side is the bottom side of the planar stack-up. The radiating elements 210 are mounted to the first side of the planar stack-up, and active components including at least the SSPAs 310 and LNAs 320 are mounted to the second side of the planar stack-up. In some embodiments, additional discrete components, such as beamformers, phase-shifters, etc. are mounted on the second side of the planar stack-up. In some embodiments, power, control, and signal networks are implemented on one or more layers between the first side of the planar stack-up and the second side of the planar stack-up.

In some embodiments, at least a first layer 402 is disposed closes to the first side, a second layer 404 is disposed closest to the second side, and a third layer 406 is disposed between the first layer 402 and the second layer 404. For example, the layers can be implemented as a multi-layer printed circuit board (PCB). The first layer 402 can be a ground plane with which the radiating elements 210 are electrically and physically coupled. The ground plane can act as a reflector to help direct the radiation pattern of the radiating elements 210. The SSPAs 310 and LNAs 320 are mounted to the third layer 406. Although not explicitly shown, the diplexers 325 (FIG. 3) are implemented in the second layer 404. In some implementations the diplexers 325 are small enough so that they have no requirement for buried resistors. However, because they radiate, they may be implemented in buried stripline to minimize interference. The second layer 404 and the third layer 406 can include one or more signal planes and/or power planes.

Figure 5:
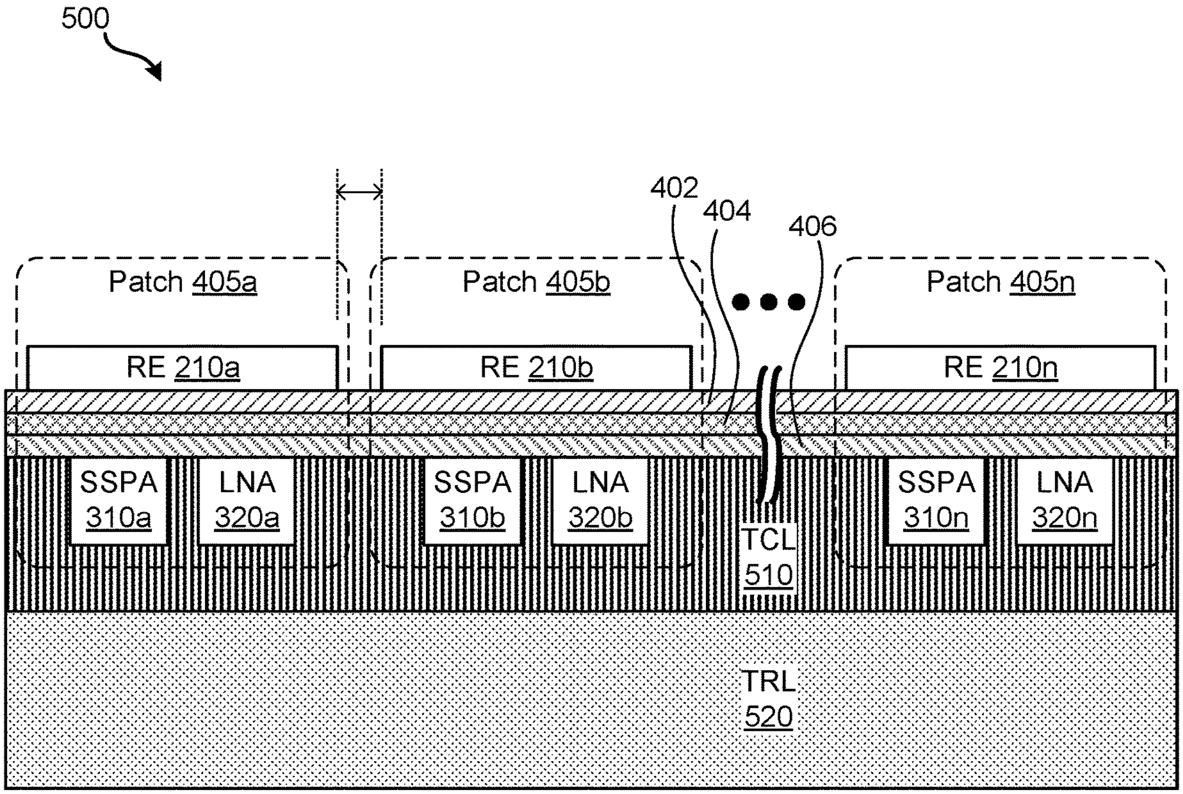
FIG. 5 shows an example patch antenna array of radiating element configurations, such as those of FIG. 4, with heat management components.

Particularly when used with a large patch array (e.g., over one thousand radiating elements 210), the compact design of FIG. 4 can generate a significant and undesirable amount of heat. FIG. 5 shows an example patch antenna array 500 of radiating element configurations 410, such as those of FIG. 4, with heat management components. As in FIG. 4, each radiating element configuration 410 can be an implementation of radiating element configuration 300 of FIG. 3, including a respective radiating element 210, SSPA 310, and LNA 320 (and diplexers 325, not shown).

In addition to the layers described with reference to FIG. 4, FIG. 5 includes two heat management layers: a thermal conduction layer (TCL) 510, and a thermal radiation layer (TRL) 520. In some embodiments, the thermal conduction layer 510 is implemented as a graphoil layer. In some such embodiments, the graphoil layer is shaped in a manner that provides a high degree of thermal contact between the active components on the third layer 406 (and the third layer 406 itself) and the graphoil. For example, the graphoil sits on a template that conforms to the profile of the active components, and the template contains a mechanism to pull the template and graphoil onto the active components with a controllable amount of force to create a stable thermal path.

In some embodiments (e.g., in addition to or as an alternative to the graphoil), a thermally conductive bonding material is used as the thermal conduction layer 510. For example, one or more compressible, thermally conductive materials is disposed between the third layer 406 and the thermal radiation layer 520, or between the third layer 406 and the graphoil. For example, the compressible, thermally conductive material can include one or more thermal pads, polymer matrices filled with thermally conductive materials, thermal gap fillers, thermal phase change materials, thermally conductive foams, and/or thermally conductive elastomers.

In some embodiments (e.g., in addition to or as an alternative to the graphoil and/or thermally conductive bonding material), the thermal conduction layer 510 is implemented as a vapor chamber layer. The vapor chamber layer is implemented as a flat, thin enclosure containing a small amount of liquid under vacuum conditions. The inner surfaces of the enclosure can be lined with wicking materials, such as sintered metal power, mesh screens, grooves, etc. Heat from the third layer 406 and components mounted thereon causes liquid inside the vapor chamber layer to absorb the heat and change to a vapor phase. The vapor travels to cooler regions of the enclosure, where it condenses back to its liquid phase, thereby releasing the latent heat that was absorbed.

The thermal conduction layer 510 is thermally coupled with a thermal radiation layer 520. In some embodiments, the thermal radiation layer 520 is an optical solar reflector layer. In other embodiments, the thermal radiation layer 520 is coated with a mirror material. In other embodiments, the thermal radiation layer 520 is painted white. In operation, heat conducts from the third layer 406 (and components mounted thereon), through the thermal conduction layer 510, and into the thermal radiation layer 520, where the heat can be radiated into space and away from the patch antenna array 500.

Figure 6:
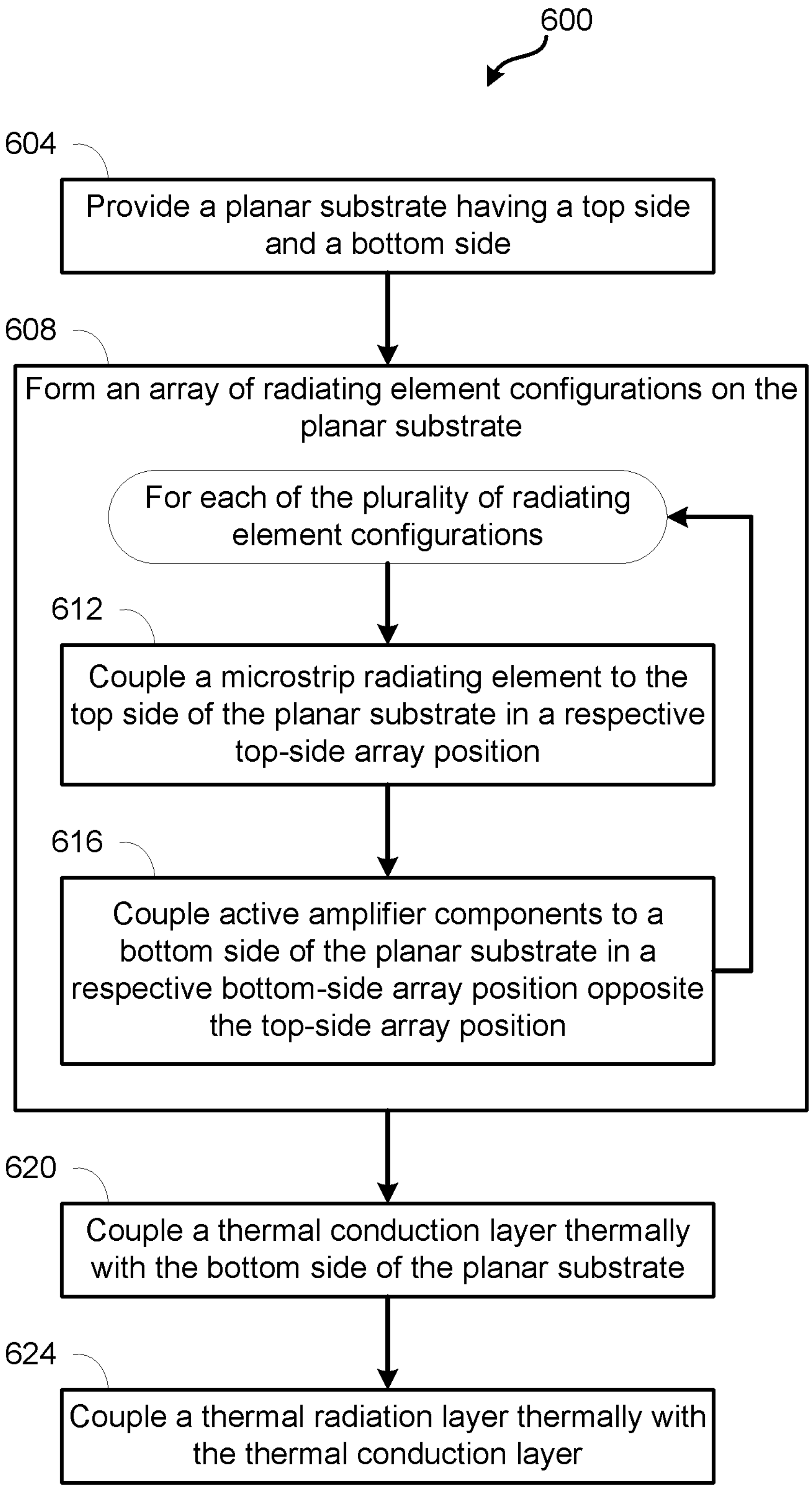
FIG. 6 shows a method for producing a direct radiating phased array antenna for installation on a satellite, according to some embodiments described herein.

FIG. 6 shows a method 600 for producing a direct radiating phased array antenna for installation on a satellite, according to some embodiments described herein. Embodiments of the method 600 begin at stage 604 by providing a planar substrate having a first side and a second side. The planar substrate can be implemented as a printed circuit board (PCB), such as a multi-layer PCB).

At stage 608, embodiments can form an array of radiating element configurations on the planar substrate. Such forming can include at least stages 612 and 616 for each of the plurality of radiating element configurations. For example, at stage 612, embodiments can couple a microstrip radiating element to the first side of the planar substrate in a respective first-side (e.g., top-side) array position. At stage 616, embodiments can couple several (e.g., two) active amplifier components to a second side of the planar substrate in a respective second-side (e.g., bottom-side) array position opposite the first-side array position. For example, the active components for each radiating element configuration includes at least a solid-state power amplifier and a low noise amplifier.

The direct radiating phased array antenna are designed to communicate signals according to a carrier frequency, such as in the S-band. In some embodiments, as described herein, the microstrip radiating element is a square patch radiating element having a side length approximately equal to one half of a wavelength of the carrier frequency in the planar substrate. In some embodiments, the array of radiating element configurations is arranged so that a patch spacing between the radiating elements in the array is at least one half of a free-space wavelength of the carrier frequency.

In some embodiments, providing the planar substrate at stage 604 includes forming the substrate as a planar stack-up having a first layer, a second layer, and a third layer. In such embodiments, the microstrip radiating element can be coupled at stage 612 to a first side of the first layer, and the active amplifier components can be coupled at stage 616 to a second side of the third layer. In some such embodiments, providing the planar substrate at stage 604 further includes forming the second layer to include, for each of the array of radiating element configurations, a pair of passive filter components (e.g., a pair of diplexers) each coupled between the plurality of active amplifier components and a respective feed port of the microstrip radiating element.

At stage 620, embodiments can thermally couple a thermal conduction layer with the second side of the planar substrate. As described herein, some embodiments of the thermal conduction layer include a graphoil layer, a compressible thermally conductive bonding material, a vapor chamber layer, and/or any feasible combination thereof. At stage 624, embodiments can thermally couple a thermal radiation layer with the thermal conduction layer. As described herein, some embodiments of the thermal conduction layer are implemented as an optical solar reflector.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A direct radiating phased array antenna comprising:
- a planar substrate having a first side and a second side;
- a plurality of radiating element configurations, each comprising:
  - a microstrip radiating element coupled to the first side of the planar substrate, the microstrip radiating element comprising a respective feed port; and
  - a plurality of active amplifier components coupled to a second side of the planar substrate; and
- a pair of passive filter components coupled between the plurality of active amplifier components and the respective feed port of the microstrip radiating element;
- a thermal conduction layer thermally coupled with the second side of the planar substrate; and
- a thermal radiation layer thermally coupled with the thermal conduction layer.

2. The direct radiating phased array antenna of claim 1, wherein the thermal conduction layer comprises a graphoil layer.

3. The direct radiating phased array antenna of claim 2, wherein the thermal conduction layer further comprises a compressible thermally conductive bonding material between the graphoil layer and the second side of the planar substrate.

4. The direct radiating phased array antenna of claim 1, wherein the thermal conduction layer comprises a vapor chamber layer.

5. The direct radiating phased array antenna of claim 1, wherein the thermal radiation layer comprises an optical solar reflector.

6. The direct radiating phased array antenna of claim 1, wherein:
- a first of the pair of passive filter components is coupled with a first feed port of the microstrip radiating element for resonating the microstrip radiating element in a first polarization orientation; and
- a second of the pair of passive filter components is coupled with a second feed port of the microstrip radiating element for resonating the microstrip radiating element in a second polarization orientation that is orthogonal to the first polarization orientation.

7. The direct radiating phased array antenna of claim 1, wherein the pair of passive filter components comprises:
a first diplexer having a first high-sub-band port coupled with an output of a power amplifier of the plurality of active amplifier components, a first low-sub-band port coupled with an input of a low noise amplifier of the plurality of active amplifier components, and a first common port coupled with a first feed port of the microstrip radiating element; and
a second diplexer having a second high-sub-band port coupled with the output of the power amplifier, a second low-sub-band port coupled with the input of the low noise amplifier, and a second common port coupled with a second feed port of the microstrip radiating element.

8. The direct radiating phased array antenna of claim 1, wherein:
a planar substrate is a planar stack-up comprising:
a first layer, wherein the microstrip radiating element of each of the plurality of radiating element configurations is coupled with a first side of the first layer;
a third layer, wherein the plurality of active amplifier components of each of the plurality of radiating element configurations is coupled with a second side of the third layer; and
a second layer disposed between a second side of the first layer and a first side of the third layer.

9. The direct radiating phased array antenna of claim 8, wherein the first layer, the second layer, and the third layer are layers of a multi-layer printed circuit board.

10. The direct radiating phased array antenna of claim 9, wherein:
each of the plurality of radiating element configurations comprises a plurality of passive filter components each coupled between the plurality of active amplifier components and the respective feed port of the microstrip radiating element; and
the plurality of passive filter components of each of the plurality of radiating element configurations is implemented in the second layer.

11. The direct radiating phased array antenna of claim 1, wherein the plurality of active amplifier components comprises a solid-state power amplifier and a low noise amplifier.

12. The direct radiating phased array antenna of claim 1, wherein:
the direct radiating phased array antenna is designed to communicate signals according to a carrier frequency; and
the microstrip radiating element is a square patch radiating element having a side length approximately equal to one half of a wavelength of the carrier frequency in the planar substrate.

13. The direct radiating phased array antenna of claim 1, wherein:
the direct radiating phased array antenna is designed to communicate signals according to a carrier frequency; and
the plurality of radiating element configurations is arranged on the planar substrate to form an array of radiating elements, wherein a patch spacing between the radiating elements in the array is at least one half of a free-space wavelength of the carrier frequency.

14. A satellite comprising:
a satellite main body; and
a direct radiating phased array antenna coupled with a face of the satellite main body and comprising:
a planar substrate having a first side and a second side;
a plurality of radiating element configurations, each comprising:
a microstrip radiating element coupled to the first side of the planar substrate;
a plurality of active amplifier components coupled to a second side of the planar substrate; and
a plurality of passive filter components each coupled between the plurality of active amplifier components and a respective feed port of the microstrip radiating element;
a thermal conduction layer thermally coupled with the second side of the planar substrate; and
a thermal radiation layer thermally coupled with the thermal conduction layer.

15. The satellite of claim 14, wherein the thermal conduction layer comprises one or more of a graphoil layer, a compressible thermally conductive bonding material, or a vapor chamber layer.

16. The satellite of claim 14, wherein the thermal radiation layer comprises an optical solar reflector.

17. The satellite of claim 14, wherein:
the direct radiating phased array antenna is designed to communicate signals according to a carrier frequency;
the microstrip radiating element is a square patch radiating element having a side length approximately equal to one half of a wavelength of the carrier frequency in the planar substrate; and
the plurality of radiating element configurations is arranged on the planar substrate to form an array of radiating elements, wherein a patch spacing between the radiating elements in the array is at least one half of a free-space wavelength of the carrier frequency.

18. A method for producing a direct radiating phased array antenna for installation on a satellite, the method comprising:
providing a planar substrate having a first side and a second side;
forming an array of radiating element configurations on the planar substrate by, for each of the plurality of radiating element configurations:
coupling a microstrip radiating element to the first side of the planar substrate in a respective first-side array position, wherein the microstrip radiating element comprises a respective feed port; and
coupling a plurality of active amplifier components to a second side of the planar substrate in a respective second-side array position opposite the first-side array position;
coupling a thermal conduction layer thermally with the second side of the planar substrate; and
coupling a thermal radiation layer thermally with the thermal conduction layer.

19. The method of claim 18, wherein:
the providing the planar substrate comprises forming the substrate as a planar stack-up having a first layer, a second layer, and a third layer;
the coupling the microstrip radiating element is to a first side of the first layer; and
the coupling the plurality of active amplifier components is to a second side of the third layer; and
the providing the planar substrate further comprises forming the second layer to include, for each of the array of radiating element configurations, a pair of passive filter components each coupled between the plurality of active amplifier components and the respective feed port of the microstrip radiating element.

* * * * *